Nov. 10, 1931.  F. C. GOLDSMITH  1,831,530
BIT HOLDING CHUCK
Filed April 21, 1928  3 Sheets-Sheet 2

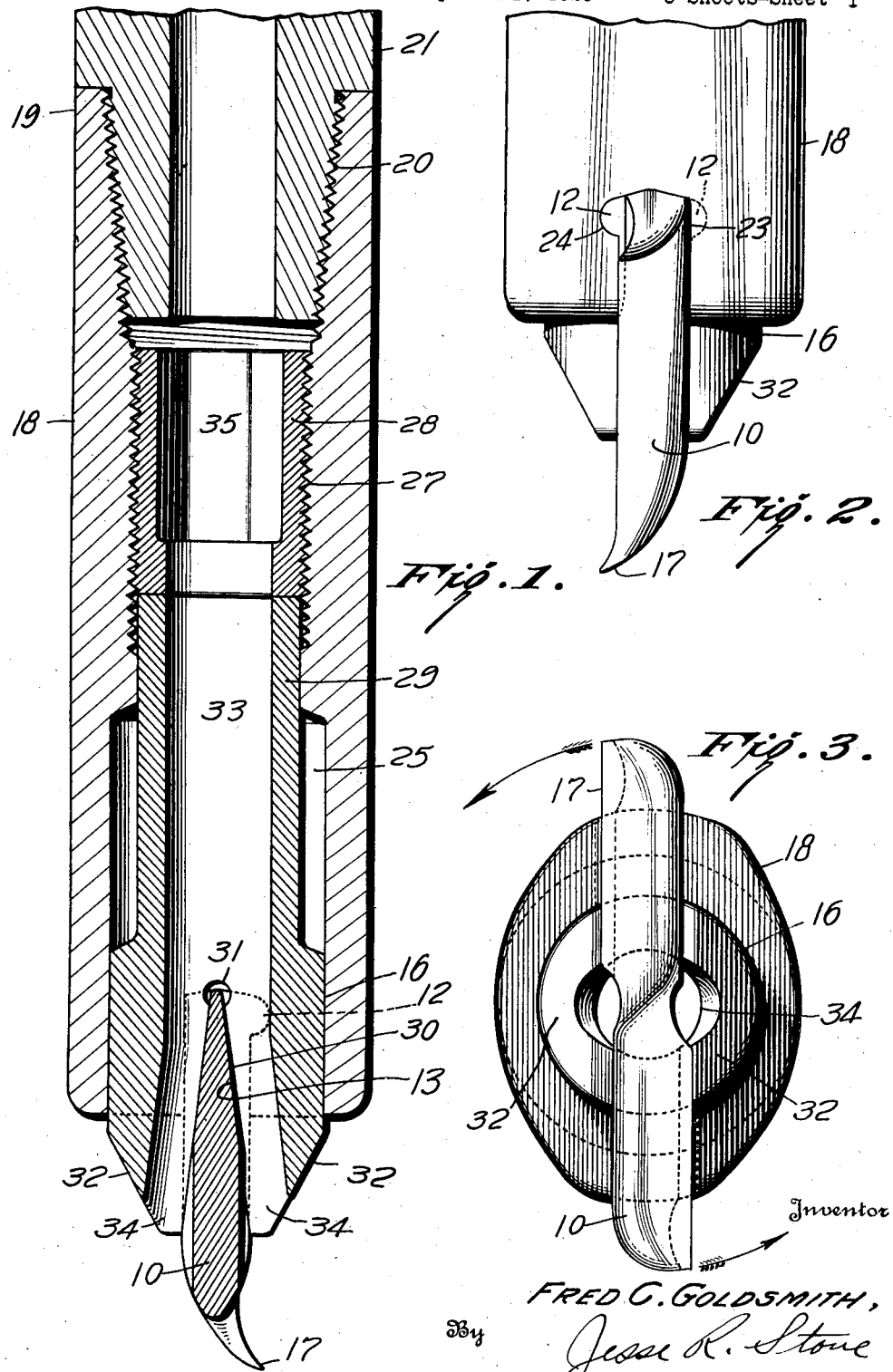

Inventor
FRED C. GOLDSMITH,
By Jesse R. Stone
Attorney

Nov. 10, 1931.  F. C. GOLDSMITH  1,831,530
BIT HOLDING CHUCK
Filed April 21, 1928  3 Sheets-Sheet 3
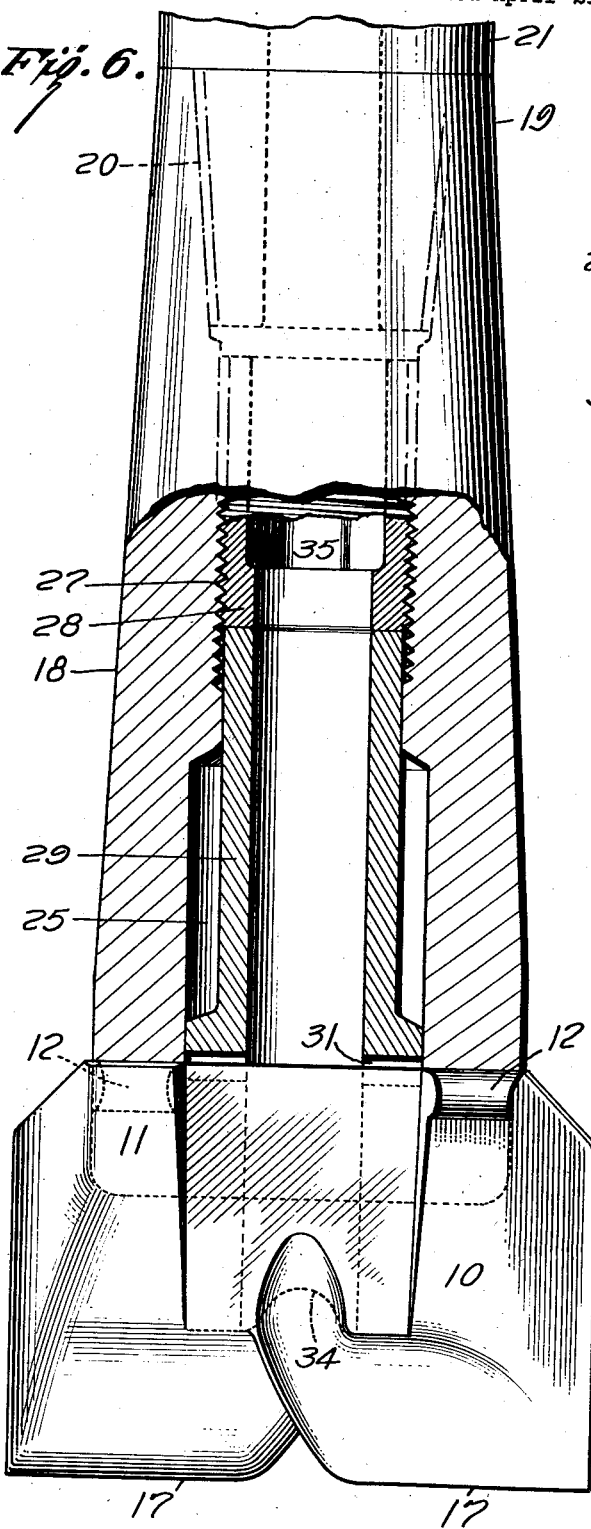
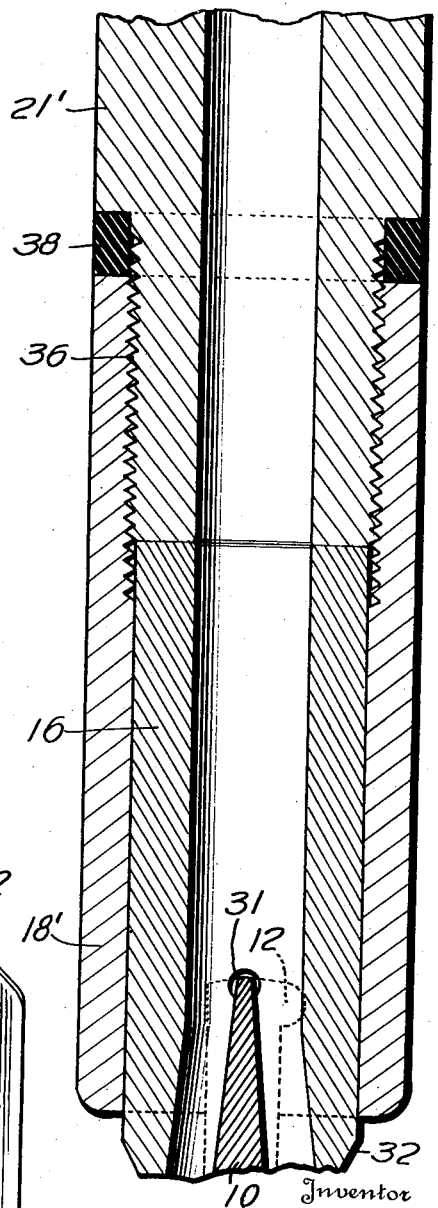
Inventor
FRED C. GOLDSMITH,
Jesse R. Stone
Attorney Patented Nov. 10, 1931

1,831,530

UNITED STATES PATENT OFFICE

FRED C. GOLDSMITH, OF HOUSTON, TEXAS

BIT HOLDING CHUCK

Application filed April 21, 1928. Serial No. 271,891.

My invention relates to chucks, or holding means, for bits. The invention is to be employed particularly with earth boring drills, but is capable of wide application to other uses of a similar nature.

In the operation of well drilling, the most common type of drilling bit, particularly in soft formations, employs a scraping blade formed to cut the bottom of the hole with a scraping action. These blades are liable to rapid wear and must be frequently removed and sharpened or renewed. When the blade is much worn it has to be discarded and the head and shank of the bit must be thrown with the junk.

Drill bits with the blade formed to detachably engage a chuck have been previously made, but it is ordinarily difficult to secure a tight engagement between the blade and chuck so that the blade will not wear at the shank and work loose. It is also a common difficulty that the bit is not easy to assemble and disassemble in use.

It is an object of my invention to provide a drill bit of the scraping type having a shank constructed to fit within a chuck and to be locked therein by means within the chuck.

It is desired to provide a chuck of tubular formation having a morticed engagement with the blade at its forward end and with an interior hollow mandrel to lock the blade against lateral movement in the chuck head.

It is also an object to provide a chuck having a channel therethrough adapted to allow the free flow of liquid through the same to discharge upon the blade closely adjacent the bottom of the hole.

It is an object to provide a chuck adapted to engage the blade with a wedging action which may be tightened in case of wear so that there will be no play between the blade and chuck.

It is my aim to provide a blade and chuck with co-engaging parts, few in number and simple in construction.

Referring to the drawings herewith for a more particular consideration of the invention;

Fig. 1 is a central vertical section through an earth boring drill embodying my invention.

Fig. 2 is a side elevation of the broken lower end of the tool.

Fig. 3 is a bottom plan view of the device.

Fig. 6 is a front elevation of the bit blade and the chuck with its engaging end partly broken away.

Fig. 7 is a central vertical section through a slightly different embodiment of the chuck.

Like numerals of reference are employed to designate like parts in each of the several views.

Figures 4, 5:
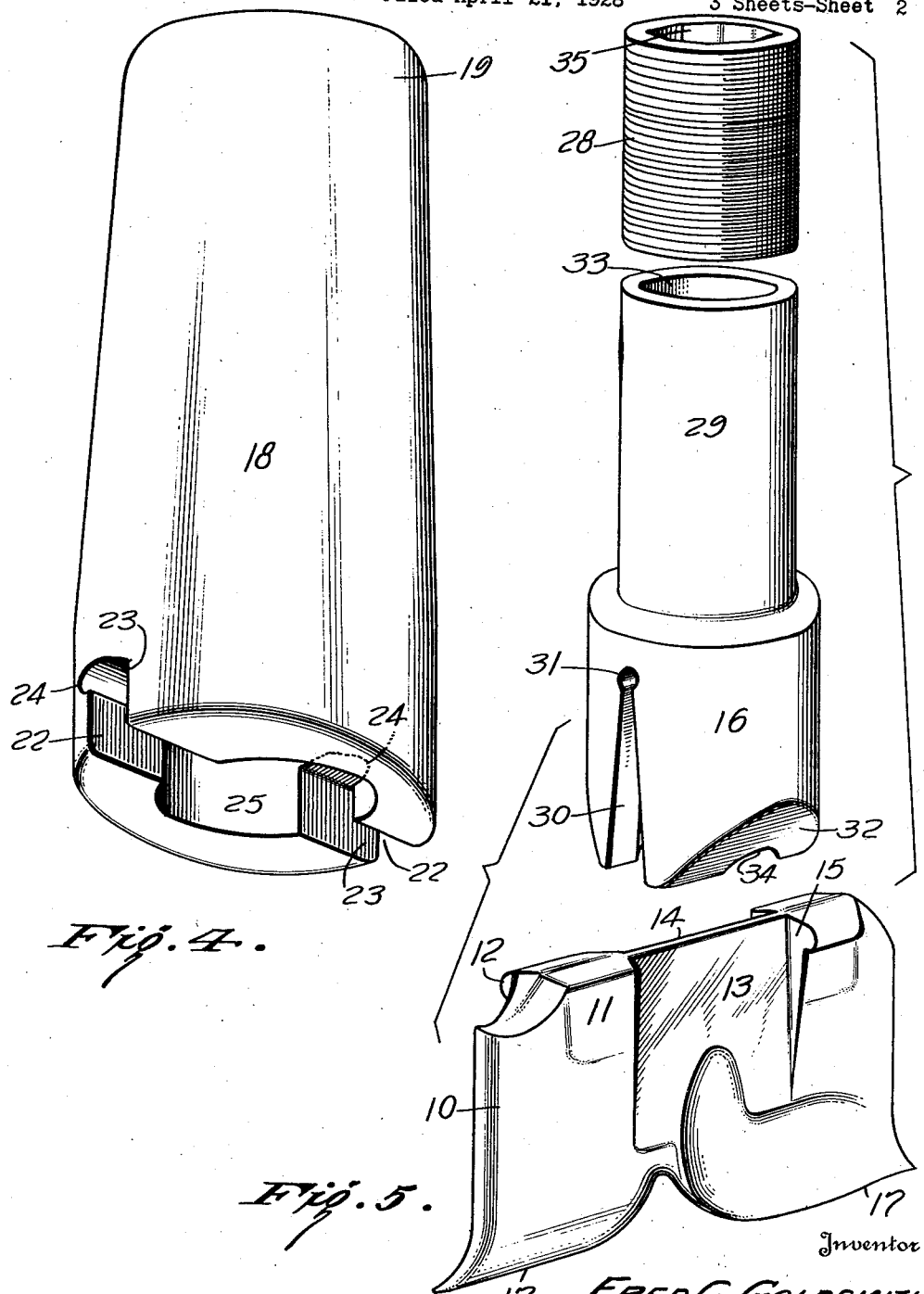
Fig. 4 is a perspective view of the body of the chuck.
Fig. 5 is a perspective view showing the bit, the mandrel and the locking collar placed in their relative order removed from the chuck body.

I contemplate employing my invention in connection with operating members of different kinds in which a tool is to be held for operation within a chuck. The invention has been shown in connection with a bit to be employed particularly in well drilling and wherein the tool is submitted to heavy strains and shocks, but while the construction has been applied to this particular art, it is to be understood that it is capable of a wide application, as will be understood from the specification which follows.

In the drawings, I have shown a blade 10 of the nature ordinarily employed in drilling where a scraping blade is used. This type of bit is ordinarily called a "fishtail" bit, because of its shape, the blade being ordinarily formed integral with a threaded shank. This blade in my invention is comparatively short in length. It is formed at its upper end for engagement with the chuck or holder within which it is detachably mounted. On each edge at the upper end, the blade is formed flat or plane on one side 11 and on the opposite side there is a projecting flange 12. As will be noted from Fig. 5, the flange on one side is formed to extend in a direction opposite to the flange upon the other face of the bit. Between the two flanges the upper end of the bit is formed with a recess to receive a locking mandrel. This recess, indicated generally at 13, is wedge-shaped with the upper edge 14 of narrow width but increasing in thickness downwardly to a point spaced somewhat below the longitudinal center of the blade. In this construction, a shoulder 15 is formed at each side of the recess 13 and between these shoulders a locking mandrel 16 is adapted to fit. The lower edge of the blade is formed in the usual manner of the fishtail bit, the cutting edge 17 of the blade being inclined slightly forward in the direction of rotation, and when referring to the blade 10 of the bit, it is to be understood that the term "forward side" is applied to the part of the blade presented forwardly in the direction of rotation of the blade while it is rotated in the usual right-hand direction in drilling. In the view shown in Fig. 5, the flanges 12 are formed on the forward sides of the blade.

The blade 10 is adapted to be held within a tubular chuck 18. Said chuck is approximately circular in outline at its upper end 19 and has an inner threaded socket 20 threaded as is the usual tool joint box to receive a pin member 21 of a drill collar or tool joint, as the case may be. The lower end of the chuck head is oval in general outline, the longer diameter of the oval being formed with a slot 22 therein to receive the upper end of the blade 10. This slot 22 is formed flat on its rearward side 23, the forward side of the slot being recessed at 24 to receive the flange 12 upon the blade. In assembling the blade within the slot 22, it will be necessary to insert the central recessed portion 13 upwardly within one of the slots with the flange 15 at one side fitting within the opening 25 through the central portion of the chuck and then moving the flange 15 within the passage laterally, bringing it within the slot 22 at the outer side thereof, the flange 12 at the opposite end also moving into the other portion of the slot 22 in an obvious manner. The lower end of the passage 25 through the central portion of the chuck is of larger diameter than the upper portion 26, and it will be noted from Fig. 6 that the smaller diameter 26 is threaded at 27 for engagement with a locking collar 28, which will be later described.

The blade is held in position when thus fitted within the lower end of the chuck by means of the mandrel 16, previously referred to. This mandrel, as will be seen from Fig. 5, has a lower head fitting closely within the lower end of the chuck. The upper portion of the mandrel, indicated at 29, is cylindrical and fits within the upper portion of the passage through the mandrel.

The lower head of the mandrel is adapted to project beyond the lower end of the chuck and is formed with an upwardly tapered diametrical slot 30 to fit over the tapered central portion of the blade and to make a wedging fit therewith. The upper end of the slot 30 terminates in a rounded recess 31 which is adapted to receive a packing member of compressible material, if desired. The lower end of the head is beveled at 32 parallel with the slot 30 so that when the mandrel is fitted over the upper end of the blade it will fit closely between the shoulders 15 on the blade and project below the head, as shown in Fig. 1, and serve to reinforce the blade on each face thereof to a point spaced a short distance from the lower cutting edge of the blade. The interior of the mandrel has a comparatively large passage 33 therethrough and this passage may be widened somewhat at 34 adjacent the lower end, to permit the free passage of fluid on both faces of the bit in an obvious manner.

When the chuck is thus fitted over the blade of the bit a locking collar 28, previously noted, may be screwed downward within the socket 27 against the upper end of the mandrel and serve to force the mandrel tightly into wedging engagement with the blade. The interior of the collar 28 is of polygonal shape, as shown at 35, so as to receive a wrench for the purpose of rotation of the collar.

If desired, the chuck and mandrel may be formed as shown in Fig. 7, wherein the inner surface of the mandrel 18' is of uniform diameter and the mandrel 16 is of uniform diameter also to fit within the opening in the chuck, the lower end of the mandrel being similar in construction to fit with the blade in the same manner as previously described. It is to be noted that the locking collar 28 may be also dispensed with by forming the upper end of the chuck with a cylindrical threaded socket 36, and the lower end of the drill collar 21' may be formed to engage with the socket so that the lower end of the pin member of the drill collar may contact with the upper end of the mandrel and serve to force it into locking engagement with the blade. To accommodate this movement a gasket or washer 38 of compressible material may be placed between the upper end of the chuck and the lower shoulder of the drill collar.

In the operation of my device, it may be employed in the same manner as the usual fishtail bit and the blade being readily detachable from the chuck, it will be possible to remove the blade for repair or replacement with little waste of time. Because of the manner in which the blade is assembled within the chuck head and locked in position, it will be possible to maintain the blade tightly in position in the chuck, and if any wear occurs about the connection between the blade and the mandrel, the mandrel may be forced more firmly into engagement with the blade by means of the locking collar 28 in the manner described.

By forming the rearward side of the slot 22 in the chuck with flat plane shoulders, there will be smooth bearing against which the thrust of the blade is taken. In this manner there is less liability of wear and it will be possible to make this type of tool with little expense for machining or otherwise preparing the rough parts for use, and a simple and economical construction is thus provided which may be furnished to the trade at a reasonable cost. The manner in which the blade is supported by the mandrel is of importance and allows the projection of a flushing fluid in large volume directly upon the cutting portion of the blade.

Having thus described my invention, what I claim as new and desire to protect by Letters Patent is:

1. In a device of the character stated, a tubular chuck head, a bit in the forward end thereof, and a bit-engaging mandrel within said chuck, co-engaging tapered faces on said mandrel and said bit whereby said bit will be retained with a wedging fit to prevent movement of said blade radially either outwardly or inwardly relative to said chuck head.

2. In a device of the character stated, a tubular chuck head having morticed slots diametrically of the forward end thereof, a bit blade having spaced upper tenons to fit said slots, and a mandrel within said chuck straddling said blade between said tenons to prevent lateral movement of said bit in the said head, said mandrel tending to reinforce said bit between said tenons.

3. In a device of the character stated, a tubular chuck head having morticed slots diametrically of the forward end thereof, a bit blade having spaced upper tenons to fit said slots, said bit blade being wedge-shaped between said tenons, and a mandrel within said chuck engaging the wedge-shaped portion of said blade to prevent lateral movement of said bit in the said head.

4. In a device of the character stated, a tubular chuck head having morticed slots transversely of the lower end, a bit blade having tenons to fit said slots, said blade having an upwardly tapered portion between said tenons, and a mandrel in said head having a slot to engage said tapered portion for the purpose described.

5. In a device of the character described, a tubular chuck head having morticed slots transversely of the lower end, said slots having flat rearward walls, the forward wall being recessed, a bit blade having tenons to fit said slots, said blade having an upwardly tapered portion between said tenons, and a mandrel in said head having a slot to engage said tapered portion for the purpose described.

6. A chuck head having a bit-engaging slot at its lower end, a blade shaped to fit said slot, a mandrel slidable within said head, tapered faces on said mandrel adapted to wedge against said blade to prevent relative movement thereof, and means to force said mandrel into wedging engagement with the opposite faces of said blade, said mandrel being tubular, said tapered faces being of such length as to project below said chuck to discharge liquid directly upon the cutting portion of said blade.

7. A tubular chuck head having a transverse slot, a blade shaped to fit said slot, the upper end of said blade being tapered upwardly transversely of its width, a mandrel slidable in said head and having a lower slot to engage on opposite faces of said tapered end of said blade and lock said blade in position.

8. A tubular chuck having a transverse slot at the lower end, a bit fitting within said slot and engaging therewith to prevent relative longitudinal movement of the blade, a tubular mandrel in said chuck, a head on said mandrel to wedge against said blade and to project beyond said chuck to support said blade, a passage through said chuck and said mandrel adapted to discharge liquid on both sides of said blade.

9. A tubular chuck head having a transverse slot at the lower end, a bit fitting within said slot and engaging therewith to prevent relative longitudinal movement of the blade, a tubular mandrel in said chuck head, means on said mandrel to wedge against the opposite faces of said blade and to project beyond said head to support said blade, and means screwed within said chuck to force said mandrel into engagement with said blade.

In testimony whereof I hereunto affix my signature this 18th day of April, A. D. 1928.

FRED C. GOLDSMITH.